United States Patent
Knittel et al.

(10) Patent No.: US 8,953,235 B2
(45) Date of Patent: Feb. 10, 2015

(54) METHOD FOR PRODUCING A SECURITY MARK ON AN OPTICAL DATA CARRIER

(75) Inventors: Joachim Knittel, Tuttlingen (DE); Hartmut Richter, Villingen-Schwenningen (DE)

(73) Assignee: Thomson Licensing (FR)

( * ) Notice: Subject to any disclaimer, the term of this patent is extended or adjusted under 35 U.S.C. 154(b) by 1623 days.

(21) Appl. No.: 11/974,789

(22) Filed: Oct. 16, 2007

(65) Prior Publication Data

US 2008/0100889 A1     May 1, 2008

(30) Foreign Application Priority Data

Oct. 30, 2006    (EP) .................................... 06123229

(51) Int. Cl.
| | |
|---|---|
| G03H 1/00 | (2006.01) |
| G03H 1/26 | (2006.01) |
| G03H 1/28 | (2006.01) |
| G11B 7/007 | (2006.01) |
| G11B 7/005 | (2006.01) |
| G11B 7/24088 | (2013.01) |
| G11B 7/26 | (2006.01) |
| G11B 20/00 | (2006.01) |
| G11B 23/00 | (2006.01) |
| G11B 23/28 | (2006.01) |
| G11B 7/0065 | (2006.01) |

(52) U.S. Cl.
CPC .......... *G11B 7/00736* (2013.01); *G11B 7/0053* (2013.01); *G11B 7/0065* (2013.01); *G11B 7/24088* (2013.01); *G11B 7/26* (2013.01); *G11B 20/00086* (2013.01); *G11B 20/00884* (2013.01); *G11B 23/0035* (2013.01); *G11B 23/281* (2013.01)

USPC ..................................... 359/2; 359/22; 359/24

(58) Field of Classification Search
USPC ............................................................. 359/2
See application file for complete search history.

(56) References Cited

U.S. PATENT DOCUMENTS

| | | | |
|---|---|---|---|
| 4,677,285 A | 6/1987 | Taniguchi | |
| 5,737,298 A | 4/1998 | Suhan | |
| 7,362,687 B2 * | 4/2008 | Tsukagoshi | ................ 369/103 |
| 7,496,024 B2 | 2/2009 | Kihara et al. | |

(Continued)

FOREIGN PATENT DOCUMENTS

| | | |
|---|---|---|
| EP | 0374256 | 2/1998 |
| EP | 1 585 132 A1 | 10/2005 |

(Continued)

OTHER PUBLICATIONS

Search Report Dated Apr. 30, 2007.

(Continued)

*Primary Examiner* — Jade R Chwasz
(74) *Attorney, Agent, or Firm* — Jack Schwartz and Associates, PLLC (57) ABSTRACT

A device for producing a security mark on an optical data carrier includes directing means for directing a first and a second light beam onto a hologram area of the optical data carrier, wherein the first and second light beams are coherent light beams. The directing means are adapted to direct the first light beam onto the hologram area along a first direction, and the second light beam onto the hologram area along a second direction. Tilting means are provided for tilting the second direction by a predefined tilt angle with respect to the first direction.

12 Claims, 4 Drawing Sheets

(56) References Cited

U.S. PATENT DOCUMENTS

| | | |
|---|---|---|
| 7,639,586 B2 | 12/2009 | Uno et al. |
| 2003/0034400 A1 | 2/2003 | Han et al. |
| 2003/0133401 A1 | 7/2003 | Dausmann et al. |
| 2003/0223100 A1 | 12/2003 | Anderson |
| 2004/0070800 A1 | 4/2004 | Kitamura |
| 2004/0255317 A1 | 12/2004 | Benedikt et al. |
| 2005/0111342 A1 | 5/2005 | Wisnudel et al. |
| 2005/0243391 A1 | 11/2005 | Drinkwater |
| 2006/0013104 A1* | 1/2006 | Kihara et al. ............ 369/103 |
| 2006/0146386 A1* | 7/2006 | Yamatsu et al. ............ 359/25 |

FOREIGN PATENT DOCUMENTS

| | | |
|---|---|---|
| EP | 1 626 407 A2 | 2/2006 |
| FR | 2702077 | 9/1994 |
| GB | 2290526 | 1/1996 |
| GB | 2326843 | 1/1999 |
| JP | 2000187854 | 7/2000 |
| JP | 2006030380 | 2/2006 |
| JP | 2006155831 | 6/2006 |
| WO | W09812703 | 3/1998 |
| WO | WO02095743 | 11/2002 |
| WO | WO 2004/095447 A1 | 11/2004 |
| WO | WO 2005/048256 A2 | 5/2005 |

OTHER PUBLICATIONS

E. Chuang et al.: "Consumer holographic read-only memory reader with mastering and replication technology", Optics Letters, vol. 31, No. 8, Apr. 15, 2006, pp. 1050-1052.

Sergei S. Orlov et al.: "Holographic shift multiplexing in thin volumetric media", J. Opt. Soc. America B, vol. 20, No. 9, Sep. 1, 2003, pp. 1912-1921.

* cited by examiner

METHOD FOR PRODUCING A SECURITY MARK ON AN OPTICAL DATA CARRIER

This application claims the benefit, under 35 U.S.C. §119, of European Patent Application No. 06123229.4 on 31 Oct. 2006.

FIELD OF THE INVENTION

The present invention is directed to a method for generating a security mark on an optical data carrier, a data carrier, comprising a security mark, a method for reading out the security mark stored on the data carrier and a device for reading out the security mark stored on the data carrier.

BACKGROUND OF THE INVENTION

The term security mark is to denote a bit sequence, which is for example used for providing an authentication key or decrypting key on a data carrier. Authentication and encryption are commonly used on data carriers in order to prevent unauthorized copying of information, which is stored on the data carrier and protected by copyright law. The authentication key is used for establishing or confirming that the data carrier contains a legally sold copy and has not been copied in breach of copyright protection. The readout of data from the data carrier is prevented if the authentication key is inexistent or incorrect. Alternatively, the data may be encrypted, such that a decrypting key is necessary for obtaining the stored information from the read out bit sequences.

The security mark may only protect unauthorized copying and reproduction of data stored on a data carrier if the security mark may not be copied using standard disk drives. Conventional disk drives such as Compact Disks (CD), Digital Versatile Disks (DVD) or BluRay Disks (BD) use a focused laser beam for storing data on the disk. Thereby, a series of microscopic indentations ("pits", with the gaps between them referred to as "lands") are formed in the recording area of the disk. The laser beam is directed onto a reflective surface of the disk to read the pattern of pits and lands. The pattern of changing intensity of the reflected beam is converted into binary data.

The international patent application WO 2005/048256 discloses using a hologram, from which a key or authentication mark can be derived. A hologram is an advanced form of photographic recording that allows an image to be recorded in three dimensions. The technique of holography can also be used to optically store, retrieve, and process information. To produce a recording of the phase of the light wave at each point in an image, holography uses a reference beam which is combined with the light from the scene or object (the object beam). Optical interference between the reference beam and the object beam, due to the superposition of the light waves, produces a series of intensity fringes that can be recorded on standard photographic film. These fringes form a type of diffraction pattern on the film, which is called the hologram or the interference pattern. Therefore two coherent light beams, an object beam and a reference beam, are necessary for recording a hologram. A conventional disk drive does not have the means for recording a hologram. The technical equipment and know how for copying a holographic recording is complex and expensive. Furthermore, the analysis and reproduction of the diffraction pattern on the film is a formidable task. Therefore, unauthorized copying and reproduction of the security mark is impeded.

However, the security mark stored as a holographic recording may not be readout using a standard disk drive. According to the international patent application WO 2005/048256 a unique spatial modulation filter must be applied at the level of the analysis of the security mark. Therefore, the holographic security mark according to the state of the art necessitates a difficult and expensive modification of the disk drive in order to be readable. The data carriers having these holographic security marks are not compatible with existing disk drives.

SUMMARY OF THE INVENTION

Therefore, it is an object of the present invention to provide an improved data carrier, comprising a security mark, which may not be copied using standard disk drive. The security mark should be readable using disk drives, which do not require an ample and expensive modification in relation to conventional disk drives. Furthermore, it is object to provide a method for generating the improved optical data carrier having the security mark, a method for reading out the security mark and a device for reading out the security mark.

The object is solved by the method for generating a security mark on an optical data carrier and the respective optical data carrier according to the appended claims.

According to the present invention, a method for generating a security mark on an optical data carrier is provided. The method comprises the steps of directing a first and second light beam onto a hologram area of the optical data carrier. The first and second light beams are coherent light beams. Consequently, the first and second light beams form an interference pattern, if they are superimposed on each other. The first light beam is directed onto the hologram area along a first direction. Preferably, the first direction is perpendicular relative to the surface of the optical data carrier. Simultaneously, the second light beam is directed onto the hologram area along a second direction. The second direction is tilted by a predefined tilt angle with respect to the first direction. The first light beam and the second light beam are either directed to the same side or to opposite sides of the optical data carrier.

The first and second light beams form an interference pattern, which is recorded in the hologram area. A conventional disk drive may not record an interference pattern, since it does not have the means for generating two coherent light beams, which may be simultaneously directed to a hologram area. Therefore, the security mark on an optical data carrier generated in the aforementioned way is safe from unauthorized copying. Furthermore, the reproduction of the security mark may be accomplished without expensively modifying existing disk drives. The normal photodetector provided for readout of the data stored on the optical data carrier is preferably used for reading the data stored in the hologram area. The additional security mark is preferably stored in a hologram area, which is an integral part of the optical data carrier. However, the security marks may likewise be recorded in a separate holographic data carrier, which is affixed to the optical data carrier. An example of such a holographic data carrier is a self-adhesive polymer tape. This material is available at very low cost under the trademark name Tesa Scribos. Of course, other holographic materials may also be used. The holograms stored in the hologram area may represent a visible image of a brand or logo, so that a consumer can identify the product.

Preferably, the tilt angle $u_s$ is greater than or equal to $-5°$ and smaller than or equal to $5°$, i.e. $-5° \leq u_s \leq 5°$. Restricting the size of the tilt angle in this way has the advantage that a reproduction of the recording in the hologram area may be accomplished using the normal photodetector provided for readout of the data stored on the optical data carrier. The local shift between the reconstructed images on the detector area is determined by the change in the tilt angle.

According to a preferred embodiment of the present invention, the first and/or second light beams are focused onto the hologram area. Thereby, the recording area may be appropriately restricted. A greater amount of data may be stored in the security mark. A focused readout beam needs to be used in order to reproduce the stored security data. Since conventional disk drives provide focused laser beams, no further modification of the disk drive would be needed in terms of the laser beam. However, alternatively a defocused first or second light beam could be used. In this case, the disk drive must be modified in order to generate a corresponding defocused readout beam. The focusing system of the readout device preferably compares the focus position of the data layer with the one necessary to read out the hologram. This is advantageously used as an additional security feature.

Preferably, a single laser source is used for generating the first and second light beams. A beam splitter is used for splitting laser light emitted from the laser source into the first and second light beams. Due to the long coherence length of laser light, the first and second light beams interfere when they reach the hologram area.

A plurality of identical security marks are preferably generated in the hologram area by shifting said first and second light beam in a third direction, e.g. perpendicular to the first and second direction. Consequently, the plurality of identical marks forms a line of overlapping identical security marks in the hologram area. The tilt angle is preferably perpendicular to the line. In this case, a reconstructed light beam does not change, if the readout light beam is shifted along the line of identical security marks. The readout of the security mark is insensitive to a shift of the readout light beam in the direction of the line of identical security marks. No additional guiding track for positioning of the readout light beam needs to be provided. Thereby, the additional cost for producing the security mark may be lessened. If the tilt angle is parallel or diagonal to the line, a guiding track needs to be provided.

Favorably, the hologram area is arranged on the optical data carrier in such a way that the line of overlapping identical security marks is perpendicular to a scanning direction for reading the information stored in the hologram area. Conventionally, the scanning direction is perpendicular to a radial direction of a circular disk. The security marks may be positioned between the centre of the circular disk and a data storage area. In this configuration, the lines are aligned along a radius of the circular disk.

The present invention is directed to an optical data carrier, which comprises a security mark. The security mark is preferably generated using the method for generating a security mark on an optical data carrier according to the present invention. However, the optical data carrier of the present invention may also be generated using other methods. The same security marks may be produced using a master hologram and the known process of contact replication, as described by Inphase et al in Optics Letter 2006, p. 1050.

The present invention also relates to a method for reading out the security mark stored on the optical data carrier according to the present invention. The inventive method comprises the step of directing a readout light beam onto the security mark along the first direction. A reconstructed light beam along the second direction is generated by the security mark, which is directed onto a detection area. An information bit corresponding to said tilt angle is detected by determining an intensity distribution of the reconstructed light beam on the detection area. The recorded security mark forms different diffraction patterns for the readout light beam depending on the tilt angle used for recording. Therefore, the reconstructed light beam, which is generated by the diffraction of the readout light beam by the security mark, forms different patterns on the detection area depending on the tilt angle. The pattern of the reconstructed light beam is detected in order to determine the information bit stored in the security mark. Information is preferably encoded in the sign of the tilt angle. However, if a position sensitive photo detector is used, it is also possible to encode information in the value of the tilt angle.

Preferably, for detecting the intensity distribution of the reconstructed light beam the detection area is divided into a plurality of adjacent photo detector areas. The detected light intensity of the adjacent photo detector areas is compared with each other. If, for example, the detection area is split in only two adjacent photo detector areas, then it is possible to determine which photo detector area has received more light by comparing the light intensity detected by the respective photo detector areas.

A readout device for reading out the security mark stored on the data carrier according to the present invention comprises a light source adapted to direct a readout light beam onto the security mark along the first and/or second direction. The readout light beam interacts with the security mark and generates a reconstructed light beam. A collimator is adapted to direct the reconstructed light beam onto a photo detector. The photo detector is adapted to detect an information bit corresponding to the tilt angle by analyzing the intensity distribution of the reconstructed light beam on the photo detector.

Preferably, a readout device for reading out the security mark stored on the data carrier according to the present invention comprises a detector having a plurality of photo detectors. The detection area is divided into a plurality of adjacent photo detector areas. The readout device comprises a comparator adapted to compare the detected light intensity of the adjacent photo detector areas.

BRIEF DESCRIPTION OF THE DRAWINGS

A preferred embodiment of the present invention is described hereinafter with reference to the accompanied drawings. The preferred embodiments may not be construed as limiting the scope of the present invention, which is defined by the appended claims. They are only meant to exemplify the present invention.

DETAILED DESCRIPTION OF PREFERRED EMBODIMENTS

Figure 1:
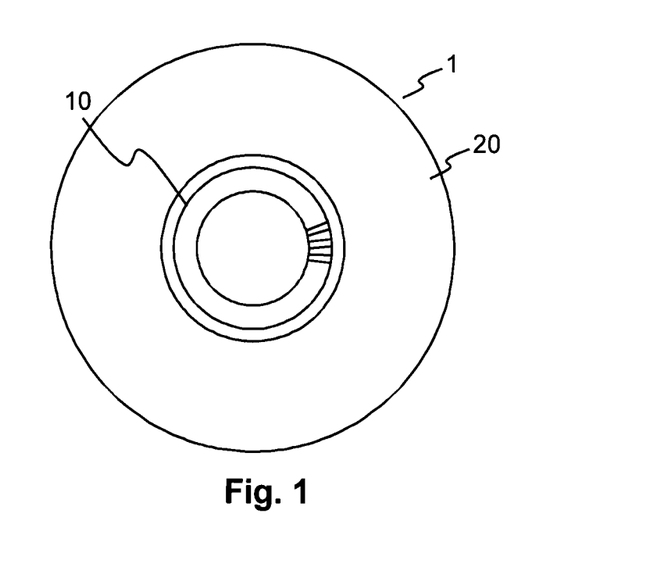
FIG. 1 shows a top view of a schematic depiction of a data carrier having a region with security marks according to the preferred embodiment of the present invention.

FIG. 1 shows a top view of a schematic depiction of a data carrier having a region with security marks according to the preferred embodiment of the present invention. The data carrier has the shape of a disk 1. A hologram area 10 is provided on the disk 1 in a region close to the centre of the disk 1. The hologram area 10 is either an integral part of the disk 1, or it is an independent holographic storage medium fixed to the disk 1. The hologram area 10 forms an annulus, i.e. a ring-shaped geometric figure. The disk 1 comprises a region 20 for data storage. The data storage region 20 also has an annular shape, which encloses the hologram area 10.

Figure 2:
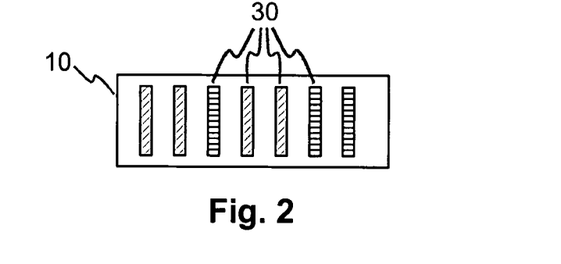
FIG. 2 shows a top view of a close up of the region of security marks of the data carrier of FIG. 1.

FIG. 2 shows a top view of a close up of the hologram area 10 of the data carrier of FIG. 1. The hologram area 10 is used for storing security marks on the data carrier. The security marks are formed as a plurality of stripes 30, which are arranged essentially in parallel to each other. More precisely, each stripe is collinear with a straight line projecting from the centre of the circular data carrier in FIG. 1 to the circumference of the circular data carrier. Adjacent stripes are approximately parallel to each other. Though the stripes 30 are drawn as separate stripes 30, they can likewise overlap.

Figure 3:
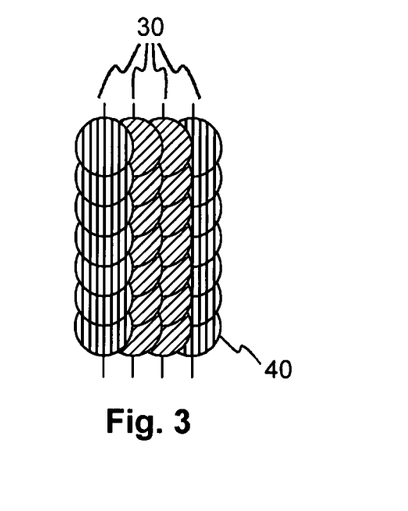
FIG. 3 shows a top view of a close up of a line of security marks of FIG. 2.

In FIG. 3 four stripes 30 of the hologram area 10 FIG. 2 are depicted. The stripes 30 consist of a plurality of approximately circular holograms 40, which are superimposed upon each other. As a consequence, the reconstructed object beam does not change when the readout beam is shifted along the stripe. The readout of the security mark is insensitive to a shift of the readout light beam in the direction of the stripe of identical holograms 40. Therefore, no additional guiding track for positioning of the readout light beam needs to be provided.

Each stripe 30 in FIG. 3 represents a single bit of information. The information bit is read out by illuminating the stripe 30 with a readout light beam. Through diffraction by the holograms 40 a reconstructed object beam is generated. The pattern of the reconstructed object beam remains virtually unchanged if the readout light beam is shifted in the lengthwise direction of each stripe 30. Therefore, the radial position of the readout light beam with respect to the stripes 30 in the hologram area 10 is uncritical. Preferably, the light beam for readout is focused in the plane of the hologram area 10. The focus position can be controlled via the conventional focus servo providing that the disk is sufficiently reflective in the region of the hologram area 10.

Figure 4:
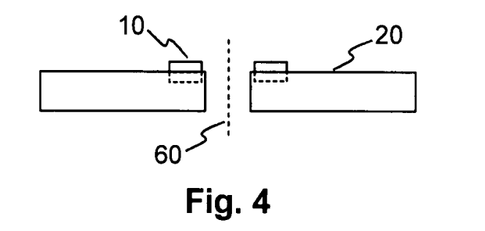
FIG. 4 shows a lateral view of the data carrier of FIG. 1.

FIG. 4 shows a cross section of the data carrier of FIG. 1. The centre of the circular data carrier is depicted by the vertical line 60 through the center hole of the data carrier. The surface of the data carrier is essentially flat except for the annular hologram area 10, which sticks out from the surface of the data carrier. In this case a readout apparatus for the data carrier 1 needs to be capable of focusing a readout light beam. onto the surface of the data carrier. Of course, the hologram area 10 may likewise be integrated within the data carrier, as indicated by the dashed lines.

Figure 5:
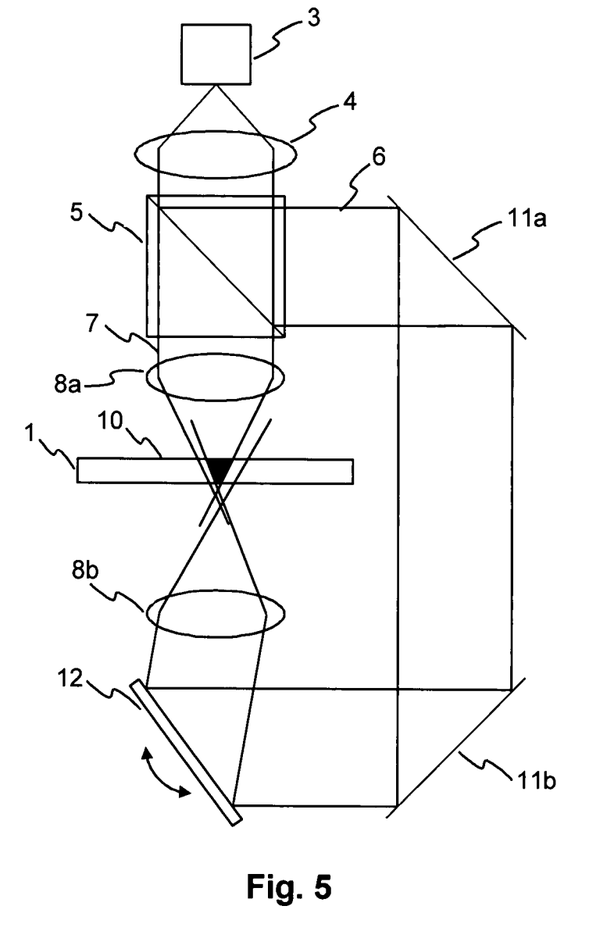
FIG. 5 shows a device for generating a security mark on an optical data carrier.

FIG. 5 shows a device for generating a security mark on an optical data carrier. The optical data carrier 1 and the hologram area of FIG. 1 are designated by reference signs 1 and 10, respectively. A laser source 3 is shown in FIG. 5. The laser light emitted from the source 3 is collimated by a collimator lens 4. It is directed through a beam splitter 5, which outputs a first collimated laser beam 7 and a second collimated laser beam 6. The first laser beam 7 is directed along a first direction and focused onto the hologram area 10 by a first objective lens 8a. The second laser beam 6 is directed along a second direction through the second objective lens 8b onto the hologram area 10. Two fixed mirrors 11a, 11b and an adjustable mirror 12 are provided in FIG. 5 in order to redirect the second laser beam 6. The second laser beam 6 reaches the hologram area 10 from the opposite side than the first laser beam 7. Of course, it is likewise possible that both laser beams 6, 7 impinge on the hologram area 10 from the same side, e.g. from the side of the first laser beam 7. Said second direction of the second laser beam 6 is slightly tilted by a tilt angle with respect to the direction of the first laser beam 7. The tilt angle can be adjusted by the adjustable mirror 12, which directs the second laser beam 6 through the second objective lens 8b.

The first and second laser beams 7 and 6 overlap within the hologram area 10 and create an interference pattern within the material. The interference pattern depends on the tilt angle, which is preferably fixed between −5° and 5°. The maximum angle depends on the type of optical data carrier and the objective lens used for playback. For example, for a Compact Disk a larger angle is needed than for a BluRay disk. The hologram area 10 in FIG. 5 is shown in a cross sectional view similar to the depiction in FIG. 4. The interference pattern introduced into the holographic material corresponds to one of the holograms 40 in FIG. 3. The second laser beam 6 in FIG. 5 is tilted in a direction perpendicular to the lengthwise direction of one of the stripes 30 in FIGS. 2 and 3. The tilt angle lies in a plane perpendicular to the radial direction of the circular data carrier 1 in FIG. 1. Therefore, the optical properties of the resulting interference pattern do not change in the lengthwise direction of the stripes 30. However, the shift selectivity in a direction perpendicular to the length of the stripes 30 is high. An information bit of 0 or 1 is encoded by the positive or negative shift angle of the second laser beam 6 and the resulting interference pattern. Several overlapping holograms 40 are written for each data bit. Furthermore, the radius of the two focused laser beams 6 and 7 within the hologram area 10 has the same magnitude.

Figure 6:
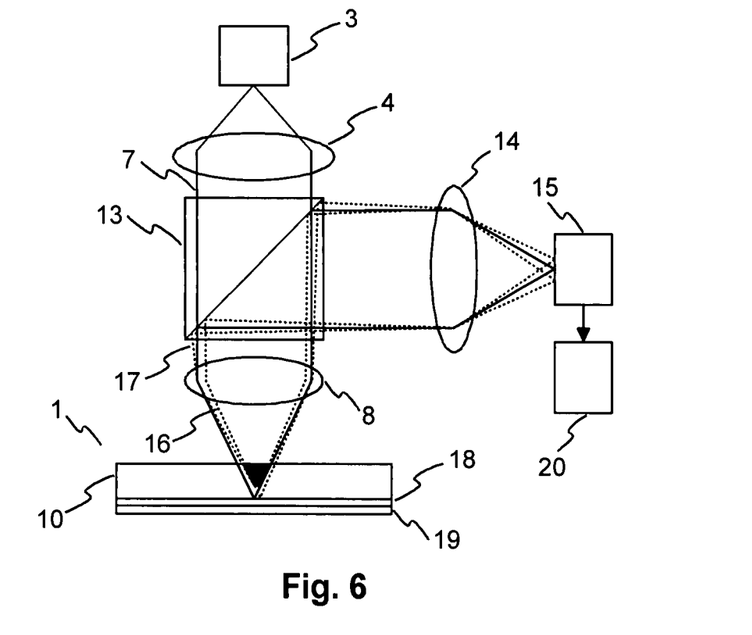
FIG. 6 shows a readout device for reading out the security mark stored on the data carrier of FIG. 1.

FIG. 6 shows readout device for reading out the security mark stored on the data carrier of FIG. 1. Identical reference signs in FIGS. 5 and 6 denote similar objects in both Figures. In particular the laser source 3, the collimator lens 4, and the collimated laser beam 7 are arranged essentially in the same way as in FIG. 5. The laser beam 7 is directed through a beam splitter 13 and an objective lens 8 onto the hologram area 10. A security mark is stored in the hologram area 10 in FIG. 6. A reflective layer 18 and a substrate 19 are positioned below the hologram area 10. Furthermore, the readout device comprises a detector 15 for detecting the light reflected from the reflective layer 18. A focus lens 14 focuses the reflected light onto the detector 15. A comparator 20 analyzes the intensity distribution detected by the detector 15 for determining the tilt angle of a reconstructed signal beam 17.

Three different laser beams 7, 16 and 17 are shown in FIG. 6. All three beams reach the detector through the detector lens 14. The first beam 7 is a beam, which passes through the interference pattern of the hologram without being diffracted. The reflection reaches the beam splitter 13 and is reflected from there to the detector 15. Part of the laser beam 7 is diffracted by the interference pattern stored in the hologram area 10 and generates the signal beam 17. This signal beam 17 is directed through the objective lens 8, the beam splitter 13 and the focus lens 14 onto the detector 15. As the signal beam 17 is slightly tilted, the focus of the signal beam 17 is situated off the centre on the detector 15. In addition, there is a second signal beam 16, which is created by the reflected, phase-conjugated readout beam 7. This phase-conjugated signal beam 16 propagates first to the reflective layer 18, before it is focused onto the detector 15. Due to the reflection losses at the mirror layer 18 the phase-conjugated signal beam 16 is much weaker than the direct signal beam 17. As a consequence, the light pattern on the detector surface of the detector 15 is formed by the superimposition of three distinct beams 7, 16 and 17.

Figure 7:
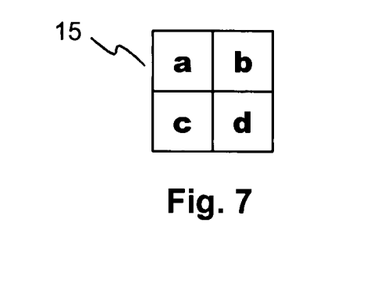
FIG. 7 shows a detection area of the readout device of FIG. 6.

FIG. 7 shows the detection area of the detector 15 of FIG. 6. The detection area is formed of four distinct detector elements a, b, c and d, which are positioned in a chequered arrangement.

Figure 8:
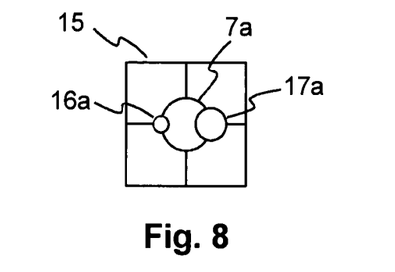
FIG. 8 shows the detection area of FIG. 7, wherein the detection area is illuminated by first readout light beams.
Figure 9:
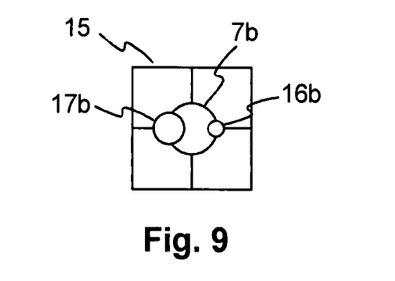
FIG. 9 shows the detection area of FIG. 7, wherein the detection area is illuminated by second readout light beams.

FIGS. 8 and 9 each show the detection area of FIG. 7. The detection area is illuminated by the different light beams 7, 16, 17 coming from the hologram area 10 of FIG. 6. Light beams 7, 16 and 17 correspond to the circular spots 7a/b, 16a/b and 17a/b, respectively. The undiffracted laser beam 7 forms a circular spot 7a/b in the centre of the detection area in both FIGS. 8 and 9. The position of the spot resulting from the signal beam 17 is shifted to the right in FIG. 8 (spot 17a) and to the left in FIG. 9 (17b). The spot resulting from the phase-conjugated signal beam 16 is shifted to the left in FIG. 8 (spot 16a) and to the right in FIG. 9 (spot 16b). The spots 7a and 7b of the undiffracted laser beam 7 have the greatest intensity of all the spots. Therefore the intensity of the spots 17a/17b is larger than the intensity of the spots 16a/b. Therefore, the light intensity distribution in FIG. 8 is shifted to the right, whereas the light intensity distribution in FIG. 9 is shifted to the left. The position of the spots 16a/b and 17a/b depends on the tilt angle used during the production of the interference pattern in the hologram area 10. Therefore, the information bit corresponding to the shift angle may be determined by finding out whether the intensity distribution is shifted to the left or right on the detection are. Let Ia, Ib, Ic and Id represent the total light intensity in the respective detector areas a, b, c and d. Then, the sign of S=(Ia+Ic−Ib−Id)/(Ia+Ib+Ic+Id) is representative of the stored information bit. The signal S is similar to a tangential push-pull signal. If a position sensitive photo detector is used, it is also possible to encode more than one information bit. In addition to the sign of the tilt angle also the value of the tilt angle can be detected.

The total normalized diffracted signal as a function of the readout beam shift is given by the following equation:

$$\eta(\delta x, \delta y) = \frac{1}{L_x L_y} \int_{-L_x/2}^{+L_x/2} \int_{-L_{yx}/2}^{+L_y/2} \mathrm{sinc}^2\left\{\frac{nL}{\lambda}\left[\frac{x\delta x + y\delta y}{R_1}\left(\frac{1}{R_2} - \frac{1}{R_1}\right) + \frac{u_s \delta x}{R_1}\right]\right\} dx\, dy$$

In this equation, the variables δx, δy represent the shift of the incident light beam 7 in FIG. 6 with respect to the recorded interference pattern in the hologram area. δy represents a shift of the incident light beam in a radial direction of the disk in FIG. 2. δx represents a shift in a scanning direction of the incident laser beam, which is perpendicular to the radial direction. The above formula applies for a single, non overlapping hologram recorded using the setup of FIG. 5. $L_x$ and $L_y$ designate the lateral extension of the hologram. L is the thickness of the hologram. n is the refractive index of the holographic material. $R_1$ is the radius of the focused incident laser beam 7 in FIG. 5. $R_2$ is the radius of the focused laser beam 6 in FIG. 5; $U_s$ represents the tilt angle between the incident laser beams 7 and 6 in FIG. 5. λ is the wavelength of the light emitted by the laser source. If both incident waves 6 and 7 have the same radius ($R_1=R_2$), then the resulting total normalized diffracted signal is independent of a signal shift in the direction δy.

Figure 10:
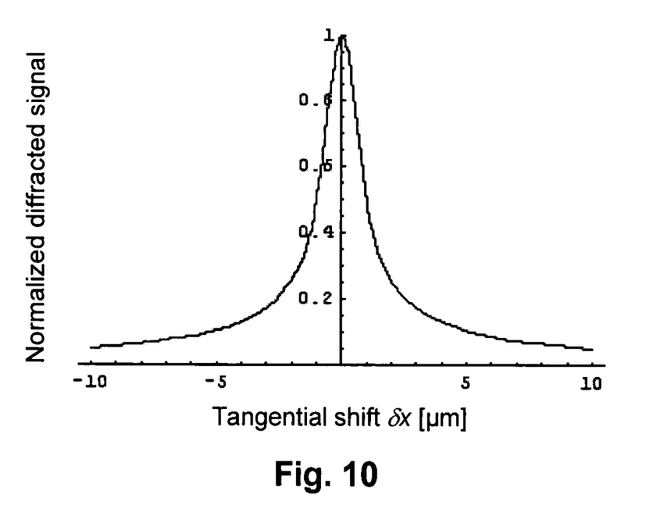
FIG. 10 shows a graph of normalized total signal intensity on the detection area of FIG. 7 versus a shift of the incident readout light beam.

FIG. 10 shows the total normalized diffracted signal I(δx, δy) in relation to the shift δx. Since the signal is normalized, the maximum signal intensity is set equal to one. The curve in FIG. 10 has been calculated for the following values, which are realistic for a disk using a blue laser beam.

$R_1=R_2=R=110$ μm $L=10$ μm $L_x=L_y=70$ μm $n=1.6$ $u_s=3°$

The total normalized diffracted signal represents a distribution, which has a singular peak at δx=0. The total signal intensity decreases continually in the positive and negative direction δx. At around ±5 μm the total signal intensity has reached less than ⅕ of the peak. The shift selectivity is roughly about 10 μm. Therefore, adjacent interference patterns are distinguishable if they are recorded at a distance of 10 μm. If the security markers are recorded in a distance r=20 mm from the centre of the disk in FIG. 2, then the circumference of the security marker region is equal to 2πr and the total number of bits is equal to 2πr/10 μm=12500 raw data bits.

The main advantages of the security mark recorded according to the preferred embodiment are the following. The additional security mark is compatible with existing disk families such as Compact Disk (CD), Digital Versatile Disk (DVD) and BluRay disk (BD). The readout device of FIG. 6 corresponds largely to existing readout devices. A comparator 20 for determining the light intensity distribution on the detector area has to be added to existing readout devices in order to detect the stored information bit. However, the standard photodetector for data readout can be used for reading the security marks. The costs for adapting the existing readout devices are low. The production of the respective data carriers having the security mark is also very low.

The above preferred embodiment is not intended to restrict the scope of protection to be conferred to the present application. The preferred embodiment is only meant to exemplify a convenient way for implementing the invention. The invention is defined by the appended claims.

What is claimed is:

1. A method for generating a security mark on an optical data carrier, the method comprising the steps of:
   directing a first and a second light beam onto a hologram area of the optical data carrier, wherein the first and second light beams are coherent light beams, the first light beam being directed onto the hologram area along a first direction and the second light beam being directed onto the hologram area along a second direction;
   tilting the second direction by a tilt angle with respect to the first direction, wherein an information bit is encoded by at least one of a sign and a value of the tilt angle; and
   generating the security mark by performing the steps of:
   recording a first security hologram in the hologram area as an interference pattern obtained through interference of the first and the second light beam,
   shifting said first and second light beams in a third direction relative to the first and second direction,
   recording a further security hologram in the hologram area as said interference pattern obtained through interference of the first and the second light beam, said further security hologram being identical to said first security hologram, and repeating said steps of shifting said first and second light beams and recording a further security hologram such that a line of overlapping identical security holograms is formed perpendicular to a scanning direction for reading the information stored in the hologram area, wherein said interference pattern is the same for all security holograms within the line of overlapping security holograms.

2. The method according to claim 1, wherein the tilt angle is greater than or equal to −5° and smaller than or equal to 5°.

3. The method according to claim 1, wherein at least one of the first light beam and the second light beam is focused on the hologram area.

4. The method according to claim 1, having the steps of using a single light source for generating the first and second light beams, and using a beam splitter for splitting laser light emitted from the light source into the first and second light beams.

5. A device for generating a security mark on an optical data carrier, the device comprising:

directing means for directing a first and a second light beam onto a hologram area of the optical data carrier, wherein the first and second light beams are coherent light beams, the directing means being adapted to direct the first light beam onto the hologram area along a first direction and the second light beam onto the hologram area along a second direction, such that the security mark is generated through interference of the first and the second light beams;

tilting means for tilting the second direction by a tilt angle with respect to the first direction, wherein an information bit is encoded by at least one of a sign and a value of the tilt angle, and recording means for generating the security mark by performing the steps of:

recording a first security hologram in the hologram area as an interference pattern obtained through interference of the first and the second light beam, shifting said first and second light beams in a third direction relative to the first and second directions, recording a further security hologram in the hologram area as said interference pattern obtained through interference of the first and the second light beam, said further security hologram being identical to said first security hologram, and repeating said steps of shifting said first and second light beams and recording a further security hologram such that a line of overlapping identical security holograms is formed perpendicular to a scanning direction for reading the information stored in the hologram area, wherein said interference pattern is the same for all security holograms within the line of overlapping security holograms.

6. The device according to claim 5, wherein the tilt angle is greater than or equal to -5° and smaller than or equal to 5°.

7. The device according to claim 5, wherein the directing means focuses at least one of the first light beam and the second light beam on the hologram area.

8. The device according to claim 5, further comprising a single light source for generating the first and second light beams, and a beam splitter for splitting laser light emitted from the light source into the first and second light beams 9. A device for generating a security mark on an optical data carrier, the device comprising:

a source for a light beam;

a beam splitter for splitting the light beam into a first light beam and a second light beam and directing the first light beam and the second light beam onto a hologram area of the optical data carrier, wherein the first and second light beams are coherent light beams, the beam splitter being adapted to direct the first light beam onto the hologram area along a first direction and the second light beam onto the hologram area along a second direction, such that the security mark is generated through interference of the first and the second light beam;

an adjustable mirror for tilting the second direction by a tilt angle with respect to the first direction, wherein an information bit is encoded by at least one of a sign and a value of the tilt angle, and first and second objective lenses for focusing the first and second light beams on the hologram area to generate the security mark, the security mark being generated by:

recording a first security hologram in the hologram area as an interference pattern obtained through interference of the first and the second light beams focused on the hologram area by the first and second objective lenses, shifting the second light beam by the adjustable mirror in a third direction relative to the first and second direction, recording a further security hologram in the hologram area as said interference pattern obtained through interference of the first and the second light beam, said further security hologram being identical to said first security hologram, and repeating said steps of shifting the second light beam and recording a further security hologram such that a line of overlapping identical security holograms is formed perpendicular to a scanning direction for reading the information stored in the hologram area, wherein said interference pattern is the same for all security holograms within the line of overlapping security holograms 10. The device according to claim 9, wherein the tilt angle is greater than or equal to -5° and smaller than or equal to 5°.

11. The device according to claim 9, wherein the beam splitter focuses at least one of the first light beam and the second light beam on the hologram area via one of the first and second objective lenses.

12. The device according to claim 9, further comprising a single light source for generating the first and second light beams, and a beam splitter for splitting laser light emitted from the light source into the first and second light beams.

* * * * *